(12) United States Patent
Kim et al.

(10) Patent No.: US 11,327,535 B2
(45) Date of Patent: May 10, 2022

(54) MOBILE TERMINAL

(71) Applicant: LG ELECTRONICS INC., Seoul (KR)

(72) Inventors: Chiyoung Kim, Seoul (KR); Seongwoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/149,370

(22) Filed: Jan. 14, 2021

(65) Prior Publication Data
US 2022/0019269 A1    Jan. 20, 2022

(30) Foreign Application Priority Data
Jul. 17, 2020 (WO) ................ PCT/KR2020/009496

(51) Int. Cl.
*G06F 1/16* (2006.01)
*H04M 1/02* (2006.01)

(52) U.S. Cl.
CPC .......... *G06F 1/1681* (2013.01); *G06F 1/1622* (2013.01); *G06F 1/1624* (2013.01); *H04M 1/0208* (2013.01)

(58) Field of Classification Search
CPC .... G06F 1/1622; G06F 1/1626; G06F 1/1647; G06F 1/1649; G06F 1/165; G06F 1/1675; G06F 1/1681
See application file for complete search history.

(56) References Cited

U.S. PATENT DOCUMENTS

| 6,941,618 B2* | 9/2005 | Kim .................... H04M 1/0212 16/334 |
| 8,155,718 B2* | 4/2012 | Byun .................. H04M 1/0237 455/575.4 |

(Continued)

FOREIGN PATENT DOCUMENTS

| EP | 2222058 | 8/2010 |
| EP | 2506538 | 10/2012 |

(Continued)

OTHER PUBLICATIONS

PCT International Application No. PCT/KR2020/009496, International Search Report dated Apr. 15, 2021, 4 pages.

(Continued)

*Primary Examiner* — Adrian S Wilson
(74) *Attorney, Agent, or Firm* — Lee Hong Degerman Kang & Waimey

(57) ABSTRACT

To enable stable opening and closing and minimize an increase in volume and weight of a swivel type mobile terminal, the mobile terminal includes a swivel body and a main body located behind the swivel body to overlap therewith, and a hinge assembly configured to join the swivel body and the main body to rotate the swivel body based on a rotation axis in a front and rear direction A first slider of the hinge assembly move along the first rotation rail of the hinge assembly during the rotation, a main restoration part generate a restoring force for the swivel body to be in a closed or open state based on a first threshold rotation angle, and an auxiliary restoration part configured to press the main restoration part to generate a restoring force for assisting a motion of the main restoration part.

20 Claims, 15 Drawing Sheets

(56) References Cited

U.S. PATENT DOCUMENTS

| | | | |
|---|---|---|---|
| 8,270,160 B2* | 9/2012 | Liang | H04M 1/0227 |
| | | | 361/679.56 |
| 8,305,747 B2* | 11/2012 | Jhu | H04M 1/0227 |
| | | | 361/679.3 |
| 8,908,370 B2* | 12/2014 | Chou | H04M 1/0237 |
| | | | 361/679.55 |
| 8,947,870 B2* | 2/2015 | Li | H04M 1/0237 |
| | | | 361/679.26 |
| 9,237,212 B2* | 1/2016 | Lee | H04M 1/0237 |
| 2002/0102946 A1* | 8/2002 | SanGiovanni | H04M 1/0256 |
| | | | 455/575.1 |
| 2006/0060737 A1* | 3/2006 | Jeun | H04M 1/0237 |
| | | | 248/289.11 |
| 2011/0211779 A1 | 9/2011 | Lee | |

FOREIGN PATENT DOCUMENTS

| | | |
|---|---|---|
| KR | 100611480 | 8/2006 |
| KR | 20080059899 | 7/2008 |
| KR | 1020110098283 | 9/2011 |
| KR | 101090762 | 12/2011 |
| KR | 101158849 | 6/2012 |
| KR | 1020170111969 | 10/2017 |

OTHER PUBLICATIONS

European Patent Office Application Serial No. 21151745.3, Search Report dated Jun. 23, 2021, 8 pages.

* cited by examiner

FIG. 13A
FIG. 13B
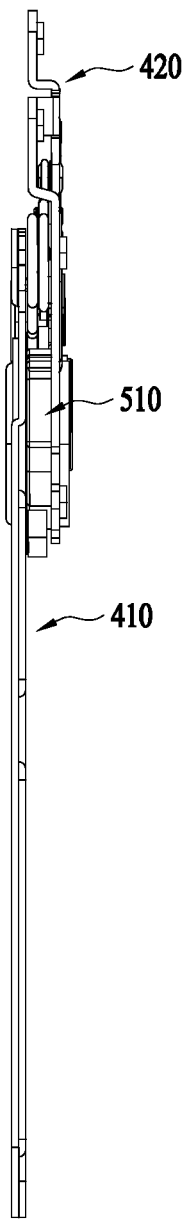
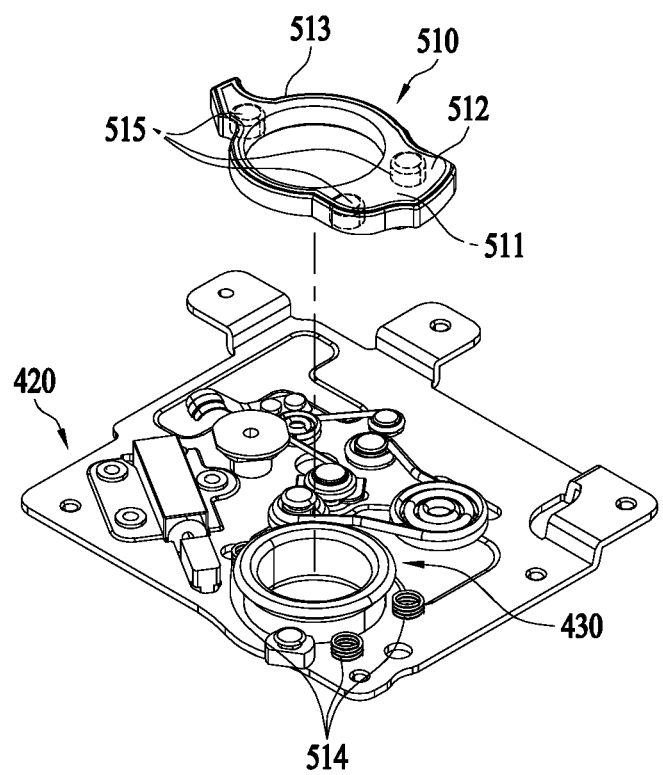

MOBILE TERMINAL

CROSS-REFERENCE TO RELATED APPLICATION

Pursuant to 35 U.S.C. § 119 (a), this application claims the benefit of an earlier filing date and right of priority to International Application No. PCT/KR2020/009496 filed on Jul. 17, 2020, the contents of which are hereby incorporated by reference herein in its entirety.

BACKGROUND

1. Field

This disclosure relates to a mobile terminal having a structure in which two bodies rotate relative to each other.

2. Description of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Such a terminal is made in the form of a multimedia device with complex functions such as, for example, taking photos or videos, playing music or video files, playing games, and receiving broadcasts.

Efforts are ongoing to support and increase the functionality of mobile terminals. Such efforts include software and hardware improvements, as well as changes and improvements in the structural components.

The terminal is required to have a wide screen in order to earnestly perform a function of the multimedia device, and is also required to secure a lightness and a minimal size to achieve a portability.

Attempts to meet the two needs in such a trade-off relationship have been continually made. The most representative one is a foldable terminal that can be used by folding and unfolding a body with a display.

In the foldable terminal, the body and the display provided in the body may be folded or unfolded together, so that the terminal is opened or closed as needed. However, to implement such structure, a foldable flexible display should be used, which may result in a limited selection of display materials or properties and increase manufacturing costs.

In consideration of these matters, the present disclosure proposes a swivel type mobile terminal in which bodies having respective displays relatively rotate while maintaining a parallel state.

The swivel type mobile terminal has to be implemented to stably and repetitively rotate the body.

Further, it is necessary to reliably rotate the body so that the body is easily converted into the closed state or the open state by rotating. In particular, it is necessary to solve a problem in which the rotation of the body is unintentionally fixed at one position during the rotation when implementing a structure that elastically opens and closes the body in order to such structure.

Further, as the opening and closing of the body are made to an extreme, shock may accumulate in the mobile terminal, making users feel uncomfortable.

Also, in a process of implementing the swivel type mobile terminal, a total volume or weight of the mobile terminal may be excessively increased, or antenna performance may be deteriorated due to the rotation.

SUMMARY

An aspect of the present disclosure is to provide a swivel type mobile terminal that enables stable and user-friendly opening and closing and implements such structures while minimizing an increase in volume or weight of the mobile terminal.

Further, another aspect of the present disclosure is to provide a mobile terminal that satisfies requirements or solves the issues described above.

According to an aspect, there is provided a mobile terminal comprising a swivel body configured to provide a first screen on a front side of the swivel body, a main body located behind the swivel body to overlap with the main body and configured to provide a second screen on a front side of the main body and a hinge assembly coupling the swivel body and the main body such that the swivel body is rotatable based on a rotation axis in a front and rear direction with respect to the main body to switch an open state to a closed state or switch the closed state to the open state, wherein the hinge assembly comprises a rotary plate coupled to the swivel body, a fixed plate coupled to the main body, a hinge provided between the rotary plate and the fixed plate to provide the rotation axis, a first rotation rail provided at one of the rotary plate or the fixed plate and a first slider provided at a remaining one of the rotary plate or the fixed plate to move along the first rotation rail, wherein the first rotation rail comprises an arc shape, a main restoration part configured to provide a restoring force generated between the rotary plate and the fixed plate and applied to the swivel body to be biased to be in the closed state or the open state based on a first threshold rotation angle of the swivel body, and an auxiliary restoration part may be configured to provide a force to the main restoration part for assisting the restoring force of the main restoration part.

The main restoration part may comprise a first main rivet provided in the rotary plate, a second main rivet provided in the fixed plate and a main spring rotatably coupled to the first main rivet and the second main rivet, wherein the auxiliary restoration part comprises a first auxiliary rivet configured to move along a rivet rail provided on the fixed plate, a second auxiliary rivet provided at the fixed plate and an auxiliary spring rotatably coupled to the first auxiliary rivet and the second auxiliary rivet, wherein the force of the auxiliary restoration part works in an angular range including the first threshold rotation angle.

The first auxiliary rivet and the first main rivet may comprise circular shapes to be in contact with each other when viewed from a front of the mobile terminal so that the force of the auxiliary restoration part may be delivered to the main restoration part and be maximized at a second threshold rotation angle.

The first threshold rotation angle may be greater than the second threshold rotation angle based on the closed state.

Based on the closed state, the first threshold rotation angle may be 19 degrees and the second threshold rotation angle may be 17 degrees.

The fixed plate may comprise a support such that the first auxiliary rivet is seated in a position to be preliminarily pressed by the main rivet.

The hinge assembly may further comprise a damper of a hydraulic type disposed between the rotary plate and the fixed plate to retract or expand in accordance with the rotation of the swivel body.

The fixed plate may comprises a receiving groove formed in the fixed plate, and wherein the receiving groove includes an opening area to receive the damper.

The hinge assembly may further comprise a pressing member provided at the rotary plate and configured to press a free end of the damper in accordance with the rotation of the rotary plate to vary a stroke of the damper.

The damper may be disposed in a slanted manner such that the damper retracts or expands in an oblique direction with respect to a front of the mobile terminal.

At least one area of each of the rotary plate and the fixed plate may comprise a conductive material, and wherein the mobile terminal may further comprise a connector configured to electrically couple the at least one area of the rotary plate and the at least one area of the fixed plate when the swivel body is changed from the closed state to the open state.

The connector may comprise a connecting rail provided at one of the rotary plate or the fixed plate and comprising a conductive rail of an arc area and a connecting protrusion provided in a remaining one of the rotary plate or the fixed plate and configured to contact the connecting rail while moving along the arc area during a rotation of the swivel body.

The connecting protrusion may further comprise an elastic area configured to be elastically pressed with respect to the front and rear direction.

The mobile terminal may further comprise a second rotation rail provided in the rotary plate and having an arc shape, and a second slider provided at the main body to move along by the second rotation rail.

The second rotation rail may comprise a constraint area that prevents the second slider from deviating in a front and rear direction, wherein the second rotation rail may comprise a coupling hole that allows the second slider to deviate in the front and rear direction, and wherein the coupling hole and the second slider overlap in the front and rear direction in a state in which the swivel body is rotated at a predetermined angle based on the closed state.

An outer rim of the rotary plate may comprise an arc shape corresponding to the second rotation rail.

The first rotation rail may be provided at the rotary plate, and the first rotation rail may comprise an area that does not overlap the fixed plate in a front and rear direction in the closed state.

The mobile terminal may comprise a first magnet and a second magnet disposed at the swivel body or the rotary plate and a third magnet provided at the main body and configured to provide an attractive force with respect to the first magnet or the second magnet to correspond to a closed state or an open state, respectively.

The mobile terminal may comprise a polyoxymethylene (POM) member provided along a circumference of the hinge to support the rotary plate and the fixed plate in a front and rear direction and at least one pressing elastic member provided on a side of the POM member to provide a force to the POM member to the rotary plate or the fixed plate in the front and rear direction.

The POM member may comprise an attachment face attached to one of the rotary plate or the fixed plate, a support face facing a remaining one of the rotary plate or the fixed plate and a friction reducing portion that forms a protruding line in one area of the support face to support the remaining one of the rotary plate or the fixed plate.

BRIEF DESCRIPTION OF THE DRAWINGS

The above and other aspects, features, and advantages of certain embodiments will be more apparent from the following detailed description taken in conjunction with the accompanying drawings, in which:

FIGS. 13A and 13B are a side view illustrating the hinge assembly and an enlarged view illustrating an area around the hinge.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
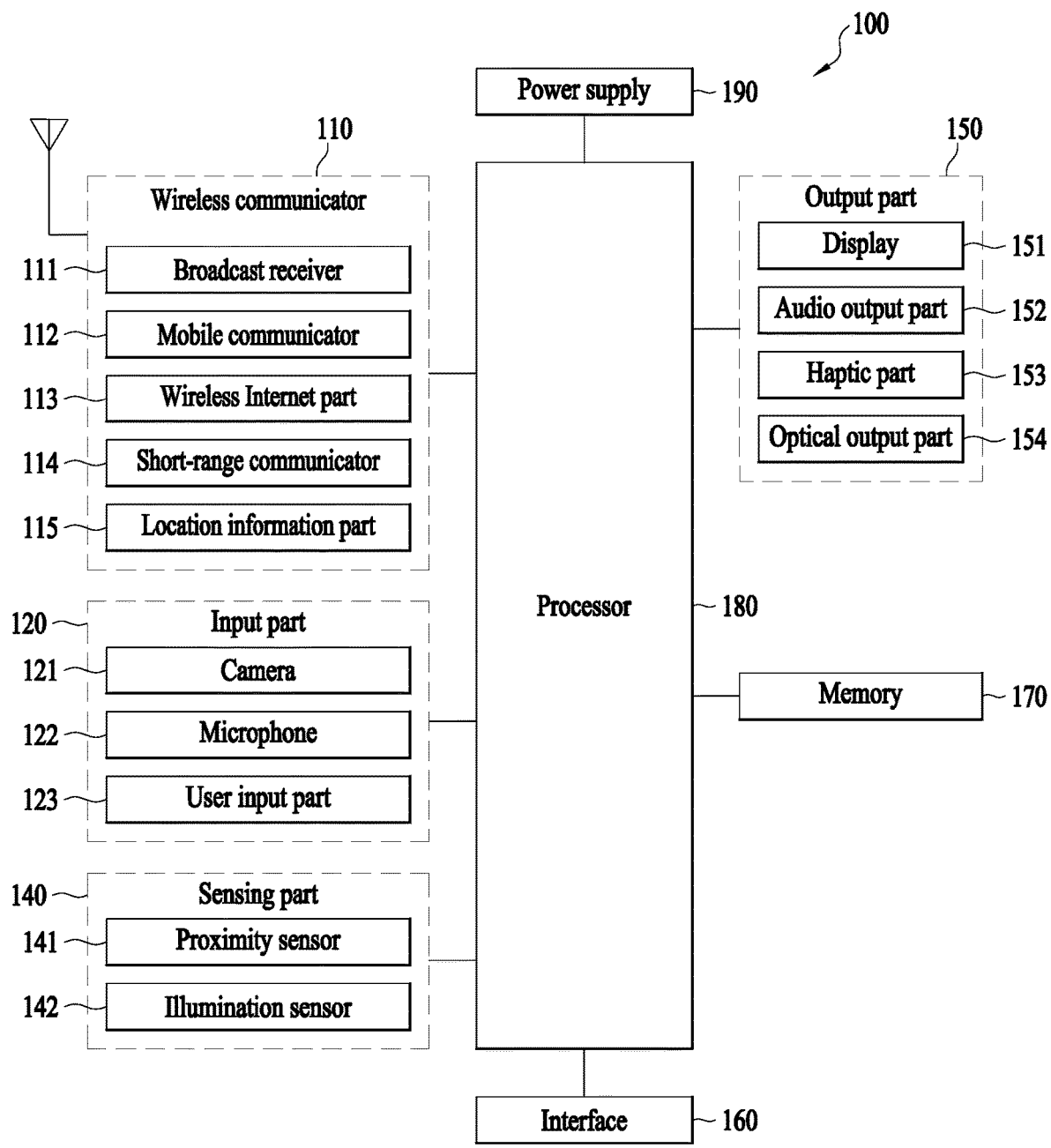
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communicator 110, an input part 120, a sensing part 140, an audio output part 150, an interface 160, a memory 170, a controller 180, and a power supply 190. It is understood that implementing all of the illustrated components is not a requirement, and that greater or fewer components may alternatively be implemented.

In detail, the wireless communicator 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communicator 110 typically includes one or more modules which connect the mobile terminal 100 to one or more networks.

To facilitate such communications, the wireless communicator 110 includes one or more of a broadcast receiver 111, a mobile communicator 112, a wireless Internet part 113, a short-range communicator 114, and a location information part 115.

The input part 120 includes a camera 121 for obtaining images or video, a microphone 122, which is one type of audio input device for inputting an audio signal, and a user input part 123 (for example, a touch key, a push key, a mechanical key, a soft key, and the like) for allowing a user to input information. Data (for example, audio, video, image, and the like) is obtained by the input part 120 and may be analyzed and processed by controller 180 according to device parameters, user commands, and combinations thereof.

The sensing part 140 is typically implemented using one or more sensors configured to sense internal information of the mobile terminal, the surrounding environment of the mobile terminal, user information, and the like. For example, in FIG. 1, the sensing part 140 is shown having a proximity sensor 141 and an illumination sensor 142. If desired, the sensing part 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing part 140, and in particular, information obtained from one or more sensors of the sensing part 140, and combinations thereof.

The output part 150 is typically configured to output various types of information, such as audio, video, tactile output, and the like. The output part 150 is shown having a display 151, an audio output part 152, a haptic part 153, and an optical output part 154. The display 151 may have an inter-layered structure or an integrated structure with a touch sensor in order to facilitate a touch screen. The touch screen may provide an output interface between the mobile terminal 100 and a user, as well as function as the user input part 123 which provides an input interface between the mobile terminal 100 and the user.

The interface 160 serves as an interface with various types of external devices that can be coupled to the mobile terminal 100. The interface 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply 190 can be configured to receive external power or provide internal power in order to supply appropriate power required for operating elements and components included in the mobile terminal 100. The power supply 190 may include a battery, and the battery may be configured to be embedded in the terminal body, or configured to be detachable from the terminal body.

Figure 2A:
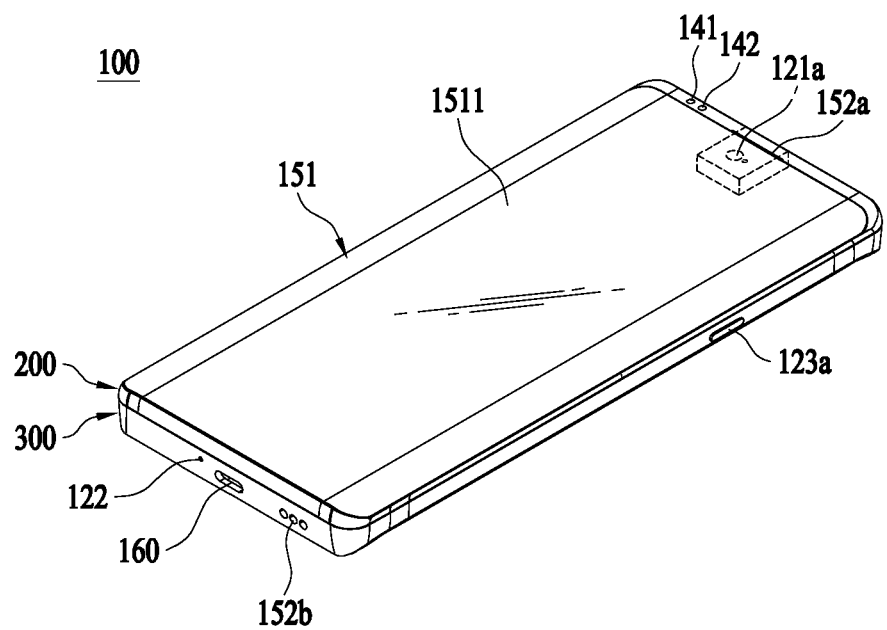
FIGS. 2A and 2B are diagrams illustrating an example of the mobile terminal viewed in different directions according to the present disclosure.
Figure 2B:
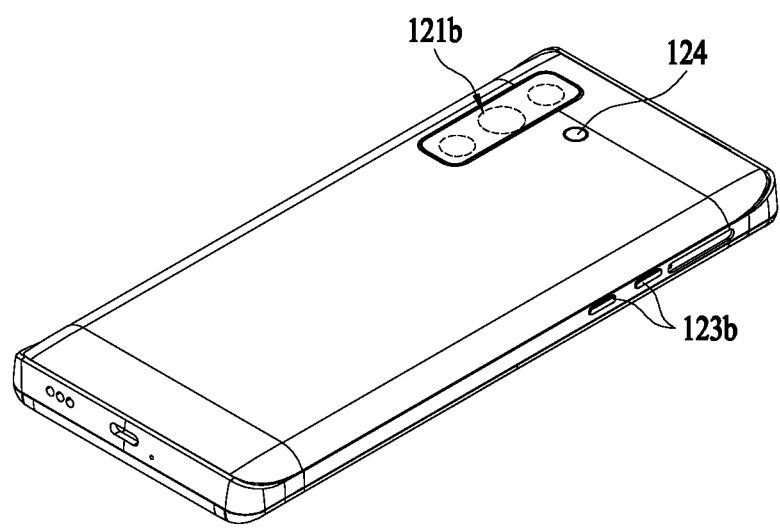
Figure 3A:
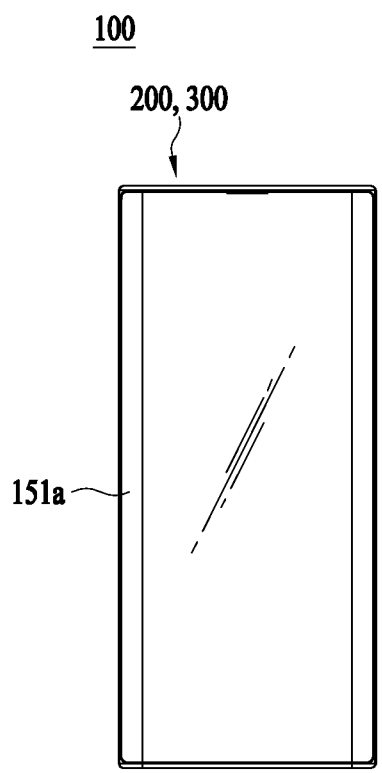
FIGS. 3A and 3B illustrate a swivel body of the mobile terminal before and after a rotation according to the present disclosure.
Figure 3A:
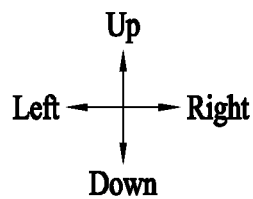
Figure 3B:
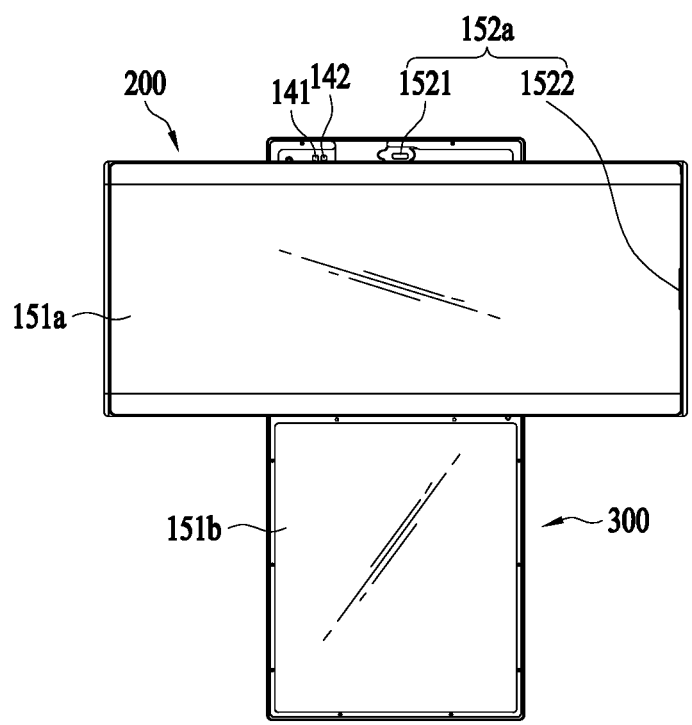

FIGS. 2A and 2B are diagrams illustrating an example of the mobile terminal 100 viewed in different directions according to the present disclosure, and FIGS. 3A and 3B illustrate a swivel body 200 of the mobile terminal 100 before and after a rotation according to the present disclosure.

The mobile terminal 100 may include a terminal body of a rotatable type. The present disclosure may be applied to various structures within a range that does not contradict the features described below.

Here, the terminal body may be understood as a concept referring to the mobile terminal 100 regarding that as at least one assembly.

The mobile terminal 100 may include two bodies 200 and 300 provided overlap each other. The two bodies 200 and 300 may include displays 151a and 151b and rotate relative to each other. A body disposed forward may also be referred to as the swivel body 200 and a body disposed rearward may also be referred to as a main body 300. A display mounted on the swivel body 200 may also be referred to as a first screen 151a and a display mounted on the main body 300 may also be referred to as a second screen 151b.

Each of the bodies 200 and 300 may include a front case and a rear case. Various electronic components may be arranged in an internal space formed by the coupling of the front case and the rear case.

At least one middle case may be additionally disposed between the front case and the rear case.

A display 151 may be disposed on a front face of each of the bodies 200 and 300 to display information. As illustrated, a window 1511 of the display 151 may be attached to the front case to form a front face of the terminal body together with the front case.

Electronic components may be mounted to the rear case of the main body 300. Electronic components to be mounted to the rear case may be, for example, a detachable battery, an identification module, a memory card, and the like. In this case, a rear cover may be detachably coupled to the rear case to cover the electronic components mounted therein. When the rear cover is decoupled from the rear case, the electronic components mounted to the rear case may be exposed outside.

When the rear cover is coupled to the rear case, a portion of a side surface of the rear case may be exposed. In some case, when the rear cover is coupled to the rear case, the rear case may be fully covered by the rear cover. Meanwhile, the rear cover may have an opening to externally expose the camera 121b or an optical output part and the flash 124.

Such cases may be formed by injection of synthetic resin, or may be formed of a metal such as stainless steel (STS), aluminum (Al), titanium (Ti), and the like, for example.

Unlike the foregoing example in which the internal space is prepared by a plurality of cases to receive the electronic components, the mobile terminal 100 may include one case to prepare the internal space. In this case, the each bodies 200, 300 of the mobile terminal 100 may be implemented as a unibody of which a portion from a side surface to a rear surface is formed of synthetic resin or metal.

Meanwhile, the mobile terminal 100 may include a waterproof portion (not shown) to prevent water from penetrating the terminal body. For example, the waterproof portion may include a waterproof member disposed between the window 1511 and the front case, between the front case and the rear case, or between the rear case and the rear cover to seal an internal space when they are coupled.

The mobile terminal 100 includes a display 151, a first audio output part 152a and a second audio output part 152b, a proximity sensor 141, an illuminance sensor 142, a light output part, a first camera 121a and a second camera 121b, a first user input part 123a and a second user input part 123b, microphone 122, interface 160, and the like may be provided.

In some embodiments, the display 151 may be implemented as a stereoscopic display for displaying stereoscopic images. A typical stereoscopic display may employ a stereoscopic display scheme such as a stereoscopic scheme (a glass scheme), an auto-stereoscopic scheme (glassless scheme), a projection scheme (holographic scheme), or the like.

The display 151 outputs information processed in the mobile terminal 100. The display 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display 151 may be implemented using two display devices, which can implement the same or different display technology. For instance, a plurality of the displays 151 may be arranged on one side, either spaced apart from each other, or these devices may be integrated, or these devices may be arranged on different surfaces.

The display 151 may also include a touch sensor which senses a touch input received at the display. When a touch is input to the display 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 1511 and a display on a rear surface of the window 1511, or a metal wire which is patterned directly on the rear surface of the window 1511. Alternatively, the touch sensor may be integrally formed with the display. For example, the touch sensor may be disposed on a substrate of the display or within the display.

The display 151 may also form a touch screen together with the touch sensor. Here, the touch screen may serve as the user input part 123 (see FIG. 1). Therefore, the touch screen may replace at least some of the functions of the first user input part 123a and 123b.

The first audio output part 152a may be implemented as a receiver that transmits a call sound to the user's ear, and the second audio output part 152b outputs various alarm sounds or multimedia playback sounds It may be implemented in the form of a loud speaker.

The window 1511 of the display 151 will typically include an aperture to permit audio generated by the first audio output part 152a to pass. One alternative is to allow audio to be released along an assembly gap between the structural bodies (for example, a gap between the window 1511 and the front case). In this case, a hole independently formed to output audio sounds may not be seen or is otherwise hidden in terms of appearance, thereby further simplifying the appearance and manufacturing of the mobile terminal 100.

The optical output part can be configured to output light for indicating an event generation. Examples of such events include a message reception, a call signal reception, a missed call, an alarm, a schedule notice, an email reception, information reception through an application, and the like. When a user has checked a generated event, the controller 180 can control the optical output part 154 to stop the light output.

The first camera 121a can process image frames such as still or moving images obtained by the image sensor in a capture mode or a video call mode. The processed image frames can then be displayed on the display 151 or stored in the memory 170.

The first and second user input parts 123a and 123b are examples of the user input part 123, which may be manipulated by a user to provide input to the mobile terminal 100. The first and second user input parts 123a and 123b may also be commonly referred to as a manipulating portion, and may employ any tactile method that allows the user to perform manipulation such as touch, push, scroll, or the like. The first and second user input parts 123a and 123b may also employ any non-tactile method that allows the user to perform manipulation such as proximity touch, hovering, or the like.

The user input parts 123a and 123b may be push keys (mechanical keys), or may be configured as a combination of touch keys and push keys. In addition, the user input parts 123a and 123b may be configured in a layered form with a fingerprint sensor.

Input received at the first and second user input parts 123a and 123b may be used in various ways. For example, the first user input part 123a may be used by the user to provide an input to a menu, home key, cancel, search, or the like, and the second user input part 123b may be used by the user to provide an input to control a volume level being output from the first or second audio output parts 152a or 152b, to switch to a touch recognition mode of the display 151, or the like.

The first user input part 123a may be located on the side surface of the terminal body. The first user input part 123a can be manipulated by a user to provide input to the mobile terminal 100. The input may be used in a variety of different ways. For example, The first user input part 123a may be used by the user to provide an input for power on/off, start, end, scroll, control volume level being output from the first or second audio output parts 152a or 152b, switch to a touch recognition mode of the display 151, and the like. The first user input part 123a may be configured to permit touch input, a push input, or combinations thereof.

Meanwhile, the mobile terminal 100 may be provided with a fingerprint recognition sensor for recognizing a user's fingerprint, and the controller 180 may use the fingerprint information detected through the fingerprint recognition sensor as an authentication means. The fingerprint recognition sensor may be embedded in the display 151 or the user input part 123.

The microphone 122 is configured to receive a user's voice or other sounds. The microphone 122 may be provided in a plurality of locations and configured to receive stereo sound.

The interface 160 may serve as a path allowing the mobile terminal 100 to interface with external devices. For example, the interface 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output part 152b can be located on the terminal body. The second audio output part 152b may implement stereophonic sound functions in conjunction with the first audio output part 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiver 111 (see FIG. 1) may be retractable into the terminal body. Alternatively, an antenna may be formed using a film attached to an inner surface of the rear cover, or a case that includes a conductive material.

A power supply 190 for supplying power to the mobile terminal 100 may include a battery, which is mounted in the terminal body or detachably coupled to an outside of the terminal body.

The battery may receive power via a power source cable connected to the interface 160. Also, the battery can be recharged in a wireless manner using a wireless charger. Wireless charging may be implemented by magnetic induction or electromagnetic resonance.

When viewed from a front face of the mobile terminal 100, the swivel body 200 and the main body 300 may be provided in shapes corresponding to each other. Specifically, the swivel body 200 and the main body 300 may have a bar-shaped appearance and, when viewed from the front face, may have a shape of a rectangle. In this instance, the rectangle may be a substantial rectangle. A direction parallel with a long side of the rectangle may be defined as a longitudinal direction of each of the bodies 200 and 300 and a direction parallel with a short side of the rectangle may be defined as a width direction of each of the bodies 200 and 300.

The swivel body 200 may be provided to be rotatable relative to the main body 300. The swivel body 200 may rotate while being parallel with the main body 300, for example, rotate based on one axis of a thickness direction (e.g., front-and-rear direction) of the mobile terminal 100 as a rotation axis.

In terms of the swivel body 200 of the rectangular shape, when viewed from a front of the mobile terminal 100, a state in which the swivel body 200 is rotated in the same direction as the main body 300 to obscure the main body 300 may be defined as a "closed state" and a state in which the swivel body 200 is rotated to be perpendicular to the main body 300 may be defined as an "open state."

A rotation angle of the swivel body 200 in a state between the closed state and the open state may be 90 degrees (°).

In the example embodiment, the open state may also refer to a state in which the swivel body 200 is rotated in a clockwise direction or rotated in a counterclockwise direction based on the closed state.

The first screen 151a of the swivel body 200 may be exposed to the front side of the mobile terminal 100 in both closed state and open state, while the second screen 151b of the main body 300 is exposed to the front side of the mobile terminal 100 only in the open state. In a process of changing from the closed state to the open state, an exposed area of the second screen 151b may gradually increase and maximized in the open state.

The first acoustic output part 152a may be provided as a receiver that delivers call sound to an ear of a user. Desirably, the first acoustic output part 152a may be disposed at a same position (e.g., a position corresponding to the ear of the user) in the mobile terminal 100 irrespective of the closed state and the open state. For this, the first acoustic output part 152a may include a first receiver hole 1521 and a second receiver hole 1522. Sound waves may be generated in a speaker module at a position on a rear face of the first receiver hole 1521 in an electronic part of the mobile terminal 100. When the swivel body 200 is in the closed state, the generated sound waves may be output through the first receiver hole 1521 and the second receiver hole 1522 in sequence. When the swivel body 200 is in the open state, the generated sound waves may be output only through the first receiver hole 1521.

The second receiver hole 1522 may be provided in a form of a slit or a perforation hole such that the sound waves output through the first receiver hole 1521 smoothly passes without being blocked with the swivel body 200 is in the closed state.

In order for the swivel body 200 to perform the same function even in the open state, the proximity sensor 141 and the illumination sensor 142 may also be included in the main body 300.

The first camera 121a may be disposed in the swivel body 200 to be always exposed on the front face of the mobile terminal 100. Alternatively, as illustrated in FIGS. 2A and 2B, the first camera 121a may also be provided in a form of a pop-up camera that is selectively exposed when being driven. The first camera 121a in the form of the pop-up camera may be provided in the main body 300 with a relatively large space, so that an efficient arrangement may be implemented.

Figure 4:
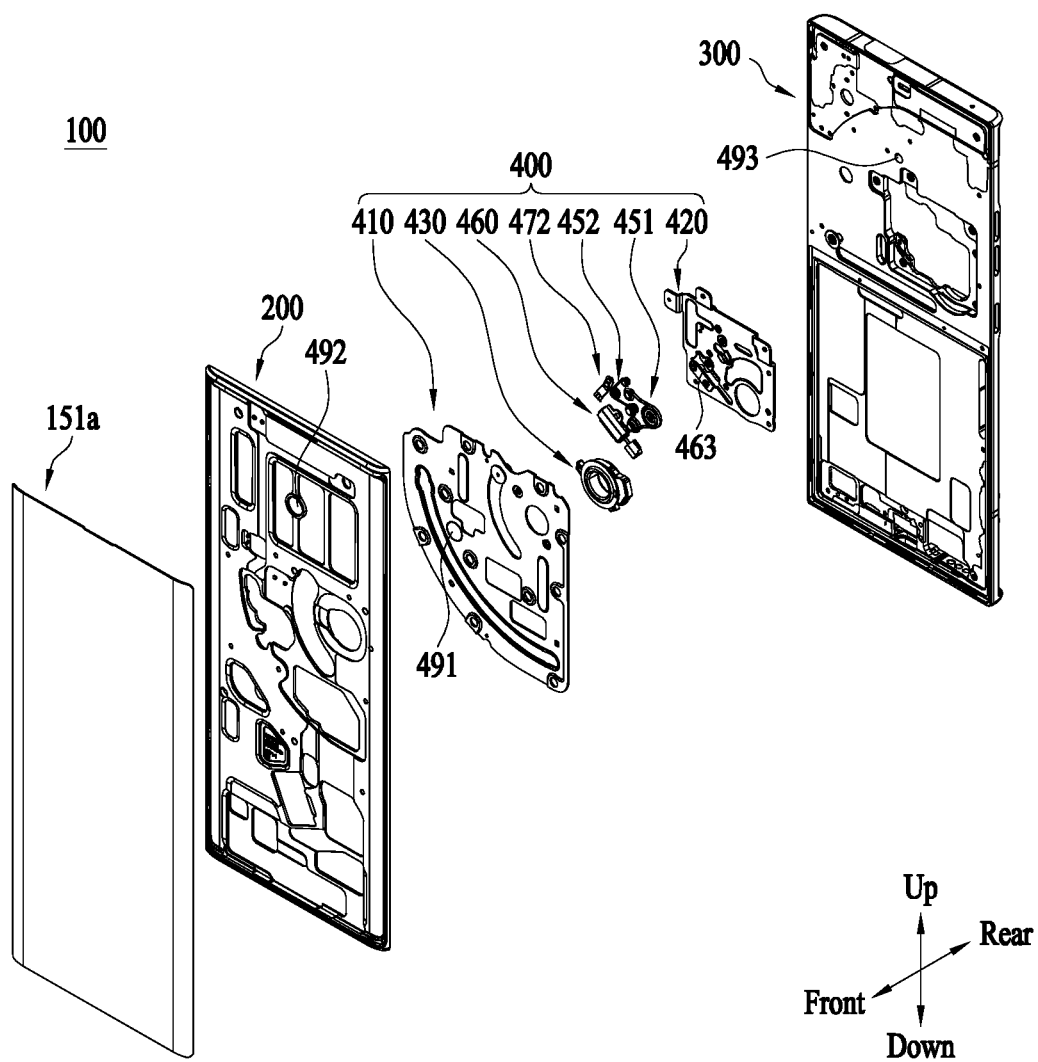
FIG. 4 is an exploded perspective view illustrating the mobile terminal according to the present disclosure.
Figure 5:
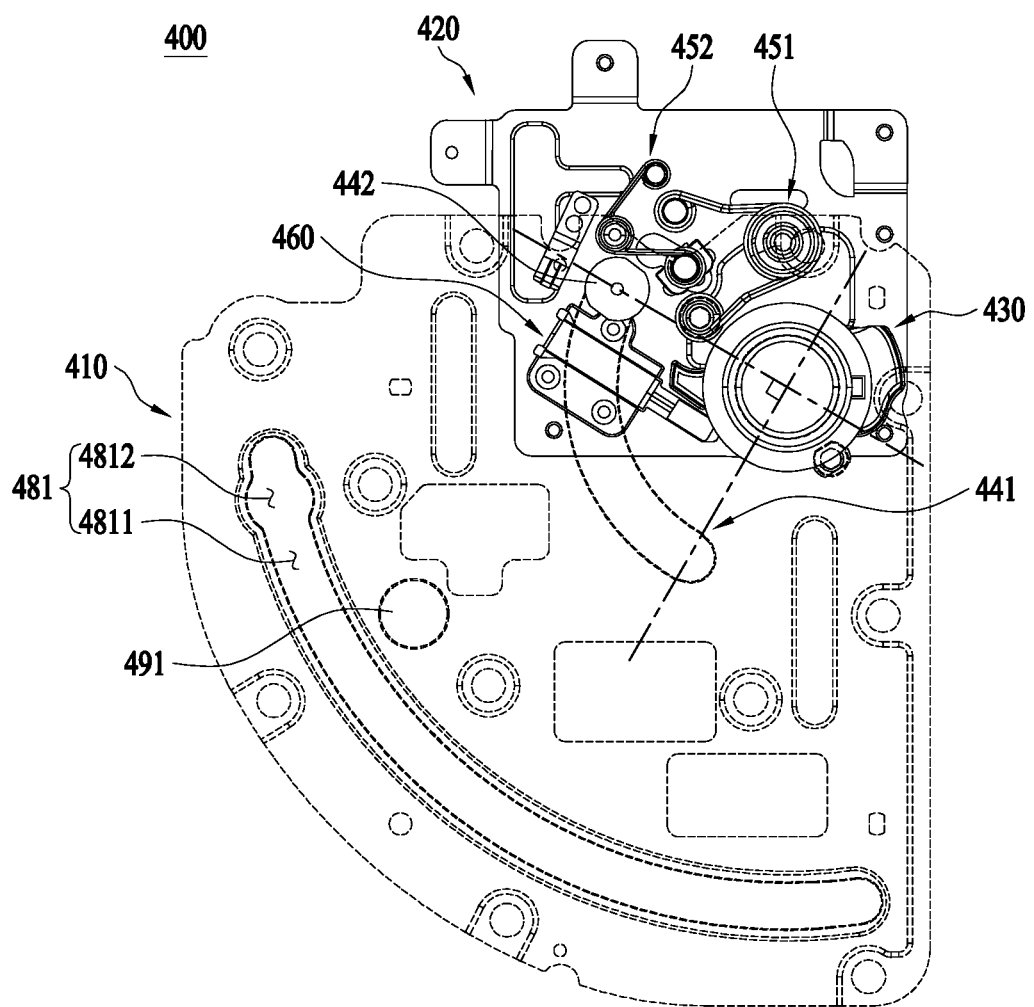
FIG. 5 is a front view illustrating a hinge assembly according to the present disclosure.

FIG. 4 is an exploded perspective view illustrating the mobile terminal 100 according to the present disclosure and FIG. 5 is a front view illustrating a hinge assembly 400 according to the present disclosure.

The hinge assembly 400 may join (or connect) the swivel body 200 and the main body 300 such that the swivel body 200 is rotatable relative to the main body 300. The hinge assembly 400 may relatively rotate the two bodies 200 and 300 while the respective screens 151a and 151b of the swivel body 200 and the main body 300 are maintained in a mutually parallel state. In this instance, a rotation axis may be based on a front and rear direction as described above. In accordance with the rotation of the swivel body 200, the swivel body 200 may open and close the second screen 151b of the main body 300 as described with reference to FIGS. 3A and 3B. That is, the mobile terminal 100 may be changed to be in the closed state (FIG. 3A) and the open state (FIG. 3B) in accordance with the rotation of the swivel body 200.

The hinge assembly 400 may include a rotary plate 410 that rotates relatively, a fixed plate 420, and a hinge 430. The rotary plate 410 may be coupled to the swivel body 200 to move integrally. The fixed plate 420 may be coupled to the main body 300 to move integrally.

The hinge 430 may be provided between the rotary plate 410 and the fixed plate 420 and provide an axis for a rotation of the rotary plate 410 with respect to the fixed plate 420, for example, a rotation axis of the swivel body 200 with respect to the main body 300.

Hereinafter, it is defined that a "rotation" referred to below without mention of a separate subject means a rotation of the rotary plate 410 with respect to the fixed plate 420 or means a rotation of the swivel body 200 with respect to the main body 300.

The hinge 430 may implement a relative rotation of the rotary plate 410 and the fixed plate 420 through a fastening of a cylindrical or ring-shaped member fixed to each plate.

The hinge assembly 400 may have a guide structure that guides a rotation of the rotary plate 410 and the fixed plate 420 and prevent a separation of the rotary plate 410 and the fixed plate 420 in addition to the hinge 430. This is because a size of the hinge 430 is relatively small, which may lead to a structural instability when only the hinge 430 is used to guide the fixation and rotation of the rotary plate 410 and the fixed plate 420.

The guide structure may complement the single hinge 430 and assist the fixation and rotation of the rotary plate 410 and the fixed plate 420. The guide structure may include a first rotation rail 441 and a first slider 442. In the guide structure, the first slider 442 may be coupled to the first rotation rail 441 to move along the first rotation rail 441 during the rotation.

The first rotation rail 441 may be provided in one of the rotary plate 410, and the fixed plate 420 or the first slider 442 may be provided in a remaining one. In the present disclosure, the description is based on a case in which the first rotation rail 441 is provided in the rotary plate 410 and the first slider 442 is provided in the fixed plate 420. However, the reverse is also possible based on the foregoing description, and the dependent features may be applied according to the same principle within a range not contradictory.

The first slider 442 may be fastened or constrained to the first rotation rail 441 and move along the first rotation rail 441. The first rotation rail 441 may be formed to correspond to a trajectory on which the first slider 442 when the rotary plate 410 rotates. For this, the first rotation rail 441 may have an arc-shaped opening. The arc may be concentric with the hinge 430.

A width-directional width of the opening of the first rotation rail 441 may be greater than or equal to a corresponding width-directional width of the first slider 442 so that the first slider 442 moves in a longitudinal direction of the first rotation rail 441. The first rotation rail 441 may be formed over 90° or more in consideration of the rotation angle of the rotary plate 410.

To prevent the rotary plate 410 and the fixed plate 420 from separating farther in the front and rear direction and prevent the first slider 442 from being decoupled from the first rotation rail 441 due to the separation, the first slider 442 may have a locking structure formed larger than the width-directional width of the opening of the first rotation rail 441.

Figure 6A:
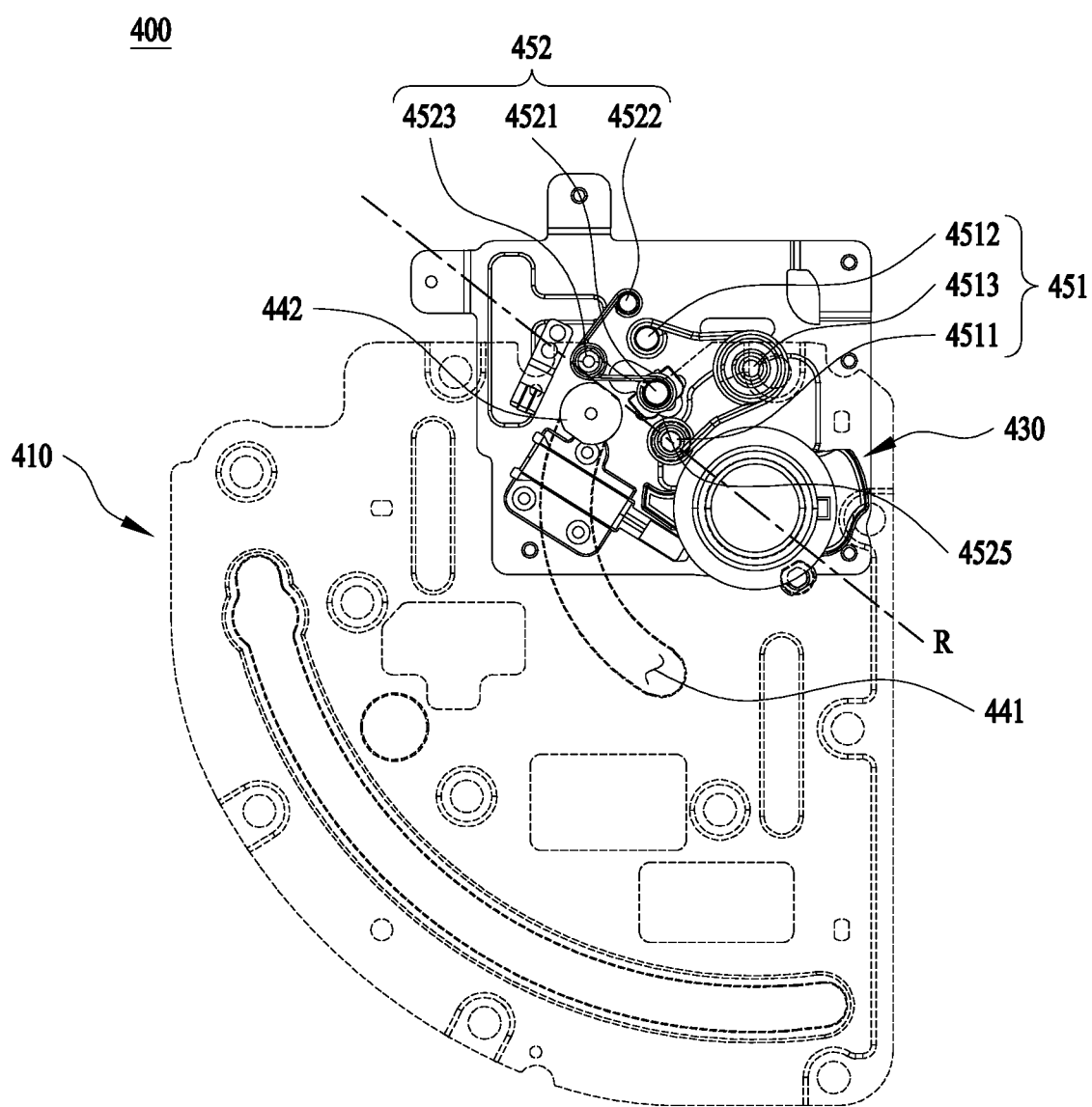
FIGS. 6A through 6C sequentially illustrate a state of the rotary plate changing from the closed state to the open state.
Figure 6B:
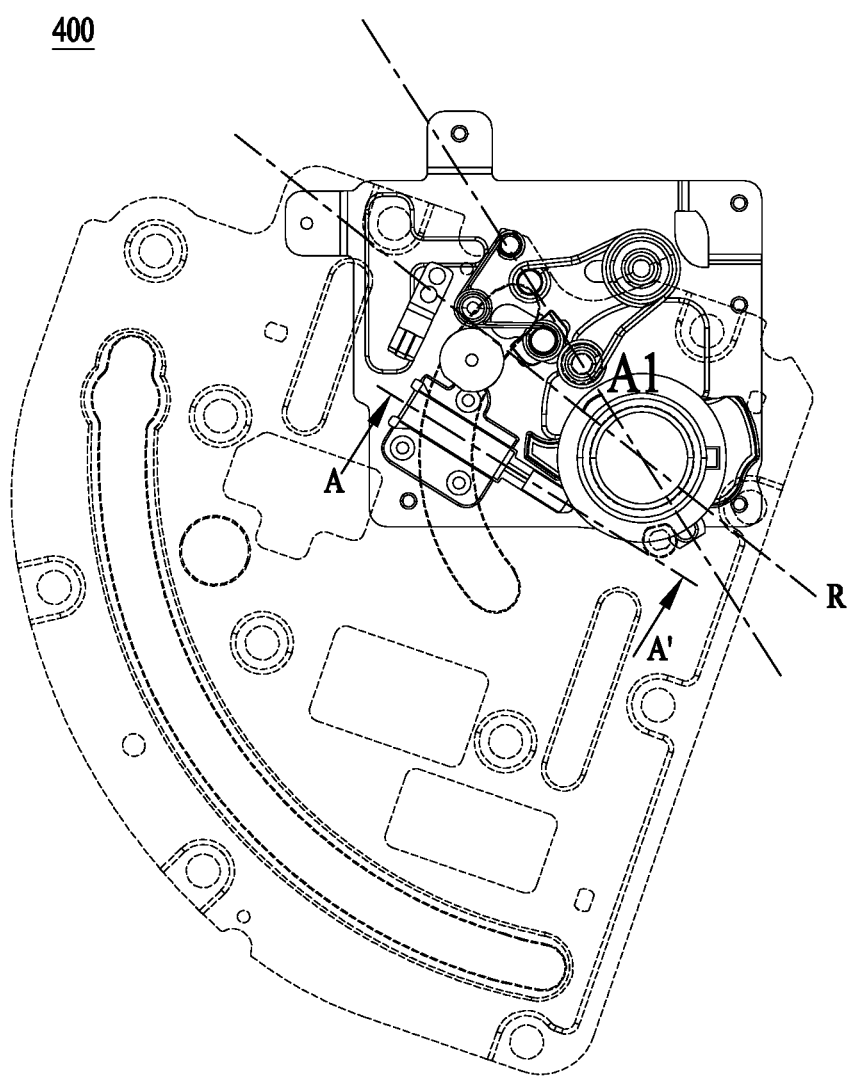
Figure 6C:
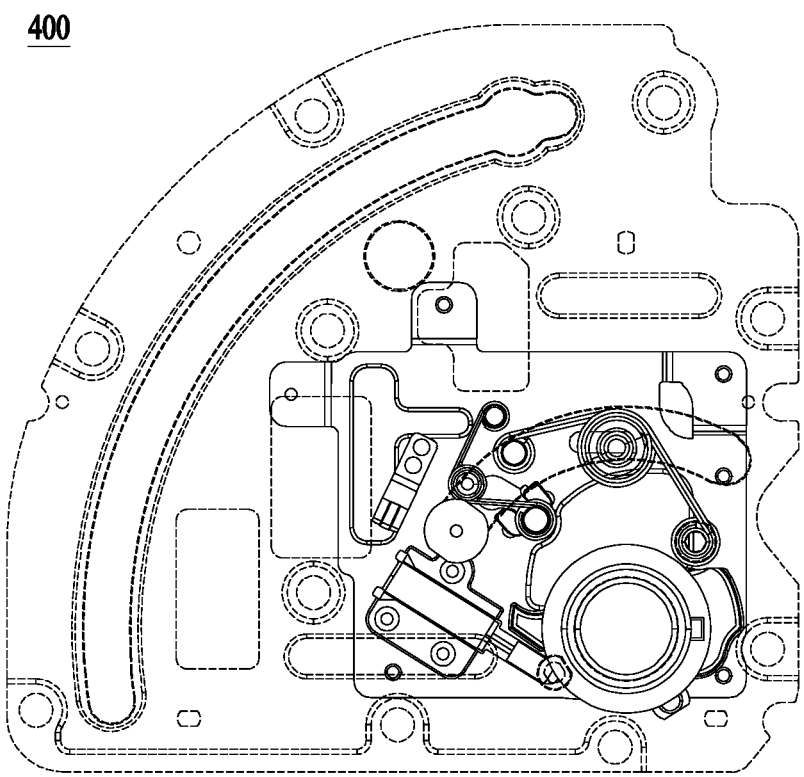

FIGS. 6A through 6C sequentially illustrate a state of the rotary plate 410 changing from the closed state to the open state.

The hinge assembly 400 may include a main restoration part 451. The main restoration part 451 may generate a restoring force when being compressed. The restoring force may be used to assist an external force applied to open and close the swivel body 200. Also, the main restoration part 451 may serve to provide a sense of distinction to a user when the swivel body 200 is opened and closed.

Specifically, the main restoration part 451 may be fixed to the rotary plate 410 at one side of the main restoration part and fixed to the fixed plate 420 at the other side of the main restoration part to provide a restoring force that causes the swivel body 200 to head for the closed state or the open state based on a first threshold rotation angle. For example, the main restoration part 451 may be stable in the closed state and the open state, and a boundary at which the restoring force that causes the swivel body 200 to be in each state is generated may be the first threshold rotation angle. In other words, the swivel body 200 may head for the closed state when the external force is removed in a state of rotating between the closed state and the first threshold rotation angle, and may head for the open state when the external force is removed in a state of rotating between the open state and the first threshold rotation angle. A size of the first threshold rotation angle, A1 may be based on a case in which the swivel body 200 is in the closed state.

Such force action may be specifically implemented by the following configurations.

The main restoration part 451 may include a first main rivet 4511 provided in the rotary plate 410, a second main rivet 4512 provided in the fixed plate 420, and a main spring 4513 rotatably coupled to the first main rivet 4511 at one end and rotatably fixed to the second main rivet 4512 at the other end. For example, the one end of the main spring 4513 may be fixed to the first main rivet 4511, and simultaneously, rotate relative to the first main rivet 4511. Also, the other end of the main spring 4513 may be fixed to the second main rivet 4512, and simultaneously, rotate relative to the second main rivet 4512. For this motion, the one end and the other end of the main spring 4513 may have ring shapes concentric with the first main rivet 4511 and the second main rivet 4512, respectively. The main spring 4513 may be provided in a form of a torsion spring and have a restoring force that allows both compressed ends of the main spring 4513 to be opened. As such, the compressed main spring 4513 may have a potential energy by the restoring force that opens the first main rivet 4511 and the second main rivet 4512 in an outward direction of a straight line connecting the two rivets 4511 and 4512, that is, an elastic force. The swivel body 200 may be opened and closed based on such force action. At the first threshold rotation angle, centers of the first main rivet 4511, the second main rivet 4512, and the hinge 430 may be on one straight line. When the first main rivet 4511 is located at an angle less than the first threshold rotation angle, the restoring force of the main spring 4513 may be provided as a torque of a direction in which the rotary plate 410 is closed. When the first main rivet 4511 is located at an angle greater than the first threshold rotation angle, the restoring force of the main spring 4513 may be provided as a torque of a direction in which the rotary plate 410 is opened.

Figure 7:
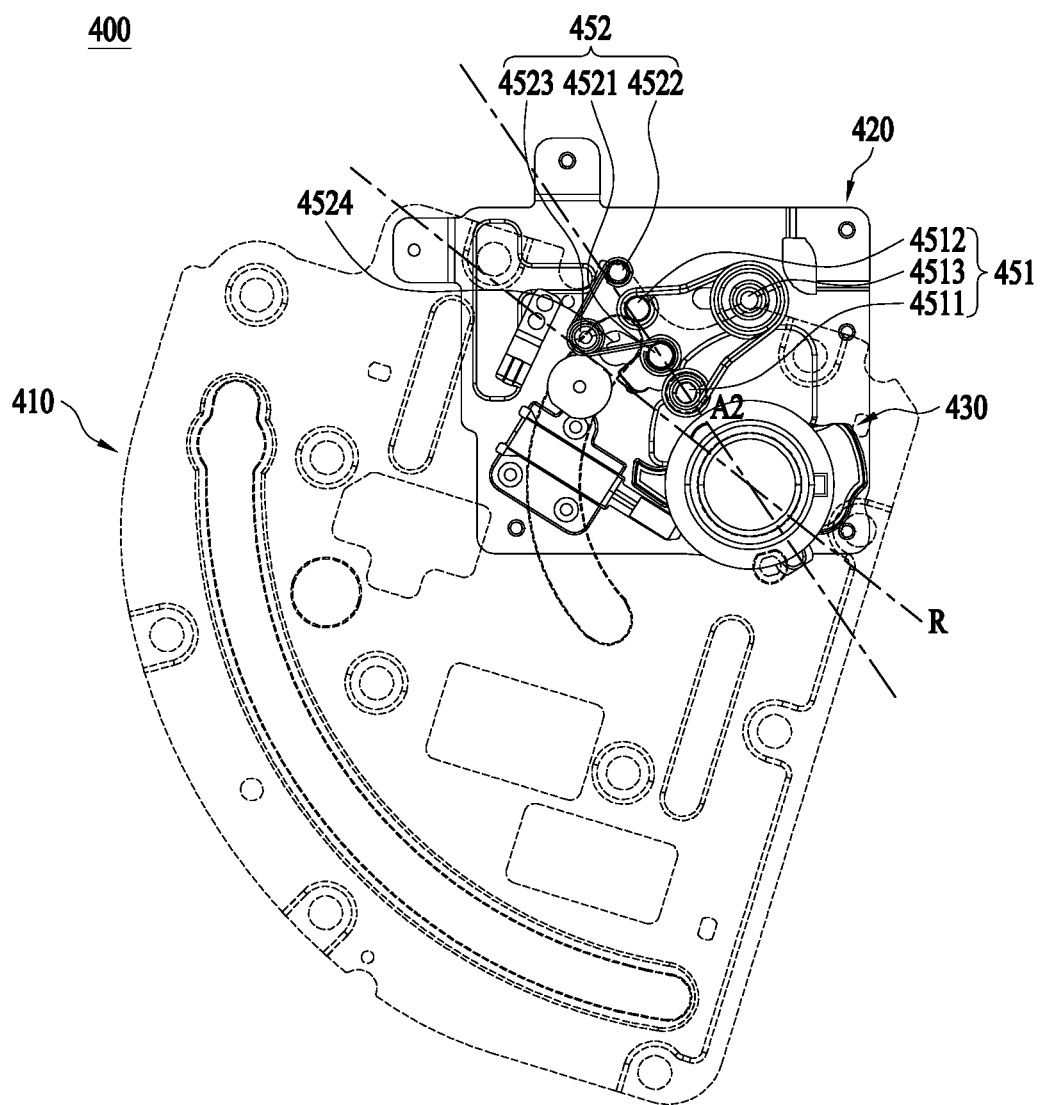
FIG. 7 illustrates a state of the hinge assembly according to an example embodiment of the present disclosure.

FIG. 7 illustrates a state of the hinge assembly 400 according to an example embodiment of the present disclosure.

An auxiliary restoration part 452 may press the main restoration part 451, thereby generating a restoring force that assists the main restoration part 451 in moving. For example, when the main restoration part 451 heads for the closed state, the restoring force may assist the main restoration part 451 to be in the closed state with increased ease. Also, when the main restoration part 451 heads for the open state, the restoring force may assist the main restoration part 451 to be in the open state with increased ease. Meanwhile, a rotation to a critical point at which an external force is absolutely required may make a larger external force required.

Although the main restoration part 451 and the auxiliary restoration part 452 perform similar functions, a reason they are provided separately is that they occupy a smaller space when compared to a case in which they are implemented as a single elastic member structure. When the main spring 4513 and an auxiliary spring 4523 are arranged to face each other as illustrated in the drawing, a space occupied by the two springs 4513 and 4523 may be formed relatively small in a two-dimensional place. Accordingly, a size of the rotary plate 410 or the fixed plate 420 for mounting the corresponding elastic member may also be reduced.

The auxiliary restoration part 452 may include a first auxiliary rivet 4521, a second auxiliary rivet 4522, and the auxiliary spring 4523. The first auxiliary rivet 4521 may move along a rivet rail 4524 provided on the fixed plate 420. The second auxiliary rivet 4522 may be provided on the fixed plate 420. The auxiliary spring 4523 may be rotatably fixed to the first auxiliary rivet 4521 at one end and rotatably fixed to the second auxiliary rivet 4522 at the other end. Other features of the auxiliary spring 4523 may be identical or similar to that of the main spring 4513 described above.

When the first auxiliary rivet 4521 moves along the rivet rail 4524 in a direction close to the second auxiliary rivet 4522, the auxiliary spring 4523 may be compressed. The compressed auxiliary spring 4523 may obtain a restoring force. By the restoring force of the auxiliary spring 4523, the first auxiliary rivet 4521 may move along the rivet rail 4524 in a direction away from the second auxiliary rivet 4522. Accordingly, the first auxiliary rivet 4521 may press the first main rivet 4511 near the first threshold rotation angle.

Specifically, the first auxiliary rivet 4521 and the first main rivet 4511 may continuously contact at side portions to be pressed each other. Also, the first auxiliary rivet 4521 and the first main rivet 4511 may have a circular front shape such as a cylinder or disk shape having a direction in which a pressure is applied varies based on a position. Since the first main rivet 4511 and the first auxiliary rivet 4521 having the circular shape are in point contact with each other when viewed from a front of the mobile terminal 100, the first auxiliary rivet 4521 may push the first main rivet 4511 in a contact direction. The contact direction may be changed based on a relative position of the first auxiliary rivet 4521 and the first main rivet 4511. For example, when the center of the first main rivet 4511 is on one side based on the straight line connecting the center of the first auxiliary rivet 4521 and the center of the hinge 430, the first main rivet 4511 may receive a force in a direction to the one side. When the center of the first main rivet 4511 is on the other side based on the straight line, the first main rivet 4511 may receive a force in a direction to the other side.

The auxiliary restoration part 452 may prevent the swivel body 200 from being stabilized in an intermediate state instead of the closed state or the open state when the main restoration part 451 becomes in equilibrium near the first threshold rotation angle.

The first auxiliary rivet 4521 may change a direction in which the first main rivet 4511 is pressed based on a second threshold rotation angle. At the second threshold rotation angle, the centers of the first main rivet 4511, the first auxiliary rivet 4521, and the hinge 430 may be on one straight line. When the first main rivet 4511 is located at an angle less than the second threshold rotation angle, the restoring force of the auxiliary spring 4523 may act in a direction in which the first main rivet 4511 is to be in the closed state. When the first main rivet 4511 is located at an angle greater than the second threshold rotation angle, the restoring force of the auxiliary spring 4523 may act in a direction in which the first main rivet 4511 is to be in the open state.

A size of the second threshold rotation angle, A2 may be based on a case in which the swivel body 200 is in the closed state.

As the main restoration part 451 and the auxiliary restoration part 452 are provided separately, the main restoration part 451 and the auxiliary restoration part 452 may have different force action boundary angles. In other words, the second threshold rotation angle of the first auxiliary rivet 4521 may be set to be different from the first threshold rotation angle, so that the force is applied. For example, the second threshold rotation angle may be less than the first threshold rotation angle. When the second threshold rotation angle is less than the first threshold rotation angle, a state in which a rotation is stagnated near the first threshold rotation angle due to other factors such as friction may be prevented. In this case, the auxiliary restoration part 452 may press the main restoration part 451 at the second threshold rotation angle, whereby the main restoration part 451 pass smoothly without stopping at the first threshold rotation angle.

When a user applied the external force in the closed state to rotate the swivel body 200 to exceed the second threshold rotation angle, the swivel body 200 may rotate further to the first threshold rotation angle by the restoring force of the auxiliary restoration part 452, and then be converted into the open state by receiving a greater force.

In this case, it is desirable that a difference between the first threshold rotation angle and the second threshold rotation angle is not significantly large. This is because force action directions of the auxiliary restoration part 452 and the main restoration part 451 are opposite in a state between the first threshold rotation angle and the second threshold rotation angle. Regarding this, based on the closed state, the first threshold rotation angle may be 19° and the second threshold rotation angle may be 17° as an example.

A size of the first auxiliary rivet 4521 and a trajectory of the first main rivet 4511 may determine an engagement of the first auxiliary rivet 4521 and the first main rivet 4511 at a predetermined angle. For example, the first auxiliary rivet 4521 may not press the first main rivet 4511 in the closed state. Instead, as the first main rivet 4511 approaches a position corresponding to the second threshold rotation angle, the first main rivet 4511 may compress the auxiliary spring 4523 by pushing the first auxiliary rivet 4521 maximally expanded by the auxiliary spring 4523. At a moment that the first main rivet 4511 exceeds the second threshold rotation angle, the restoring force of the auxiliary spring 4523 may bring about the switching into the open state.

Even in a state in which the first main rivet 4511 is not pressed, the first auxiliary rivet 4521 may be located at one position in a movement trajectory of the first main rivet 4511 to be preliminarily pressed. A support 4525 may be provided in the fixed plate 420 and leave the first auxiliary rivet 4521 to be compressed by the movement of the first main rivet 4511. The support 4525 may be defined as an end of an opening area in which the rivet rail 4524 is formed (see FIG. 6A).

By providing the main spring 4513 and the auxiliary spring 4523 to face each other and arranging the first main rivet 4511, the first auxiliary rivet 4521, the second main rivet 4512, and the second auxiliary rivet 4522 to be alternately located, a space may be minimized. In addition, even when the first main rivet 4511 moves along an arc trajectory, the main spring 4513 and the first main rivet 4511 may not interfere with other members.

Figure 8:
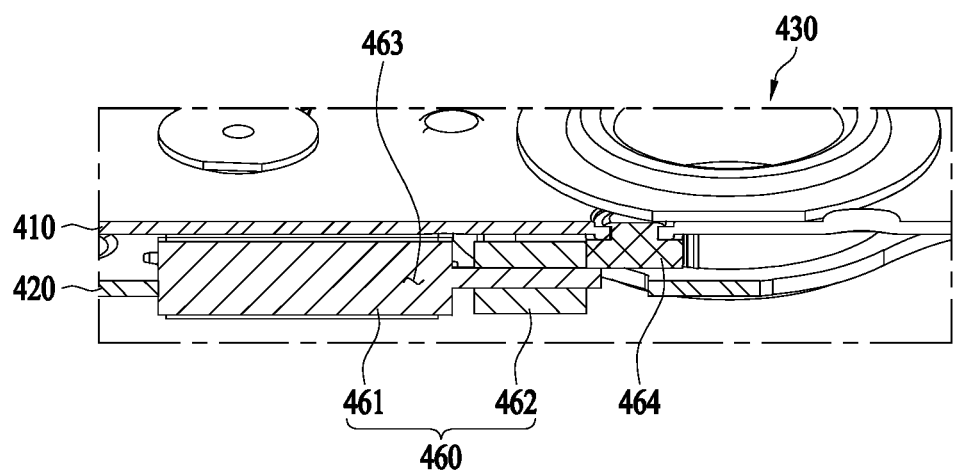
FIG. 8 is a cross-sectional view taken in a direction A-A' of FIG. 6B.

FIG. 8 is a cross-sectional view taken in a direction A-A' of FIG. 6B. FIG. 5 will be referenced together.

The hinge assembly 400 may include a damper 460. The damper 460 may mitigate a shock generated when the swivel body 200 rotates to be in the closed state or the open state. By the two elastic members 451 and 452, the swivel body 200 may reach the closed state or the open state without using an external force when rotating to exceed the first threshold rotation angle or the second threshold rotation angle. When the swivel body 200 is opened or closed by the main restoration part 451 and the auxiliary restoration part 452, the shock may be generated at a time of reaching the closed state or the open state. When such opening and closing are repeated, the shock may be accumulated, which may lead to damage or failure of the mobile terminal 100. In addition, discomfort or shock may be transmitted to a user. The damper 460 may serve to alleviate the discomfort or shock.

The damper 460 may be disposed between the rotary plate 410 and the fixed plate 420 to retract or expand in accordance with a rotation. The damper 460 may perform a damping action by generating a force that resists a direction of a motion near a retraction end point or an expansion end point.

The damper 460 may include a fixed end 461 and a free end 462 inserted in or withdrawn from the fixed end 461. The fixed end 461 may be supported by the fixed plate 420. The free end 462 may be supported by the rotary plate 410. In accordance with the rotary plate 410 rotating, the free end 462 may be inserted in or withdrawn from the fixed end 461.

The damper 460 may be accepted in a receiving groove 463 of the fixed plate 420. The receiving groove 463 may include an opening area formed in the fixed plate 420. When the damper 460 is located in the receiving groove 463 or the opening area, an increase in a thickness of the hinge assembly 400 may be minimized compared to a case in which the damper 460 is provided on one surface of the fixed plate 420.

The rotary plate 410 may include a pressing member 464. The pressing member 464 may protrude from one face of the rotary plate 410. For example, the pressing member 464 may be provided on the same plane as the damper 460, specifically, the free end 46 to interfere with the free end 462. A degree to which the pressing member 464 moves the free end 462, that is, a degree of stroke of the damper 460 may be changed based on a rotation degree of the rotary plate 410.

When viewed from a front of the mobile terminal 100, the damper 460 may be disposed such that a longitudinal direction, i.e., an expansion direction or retraction direction of the damper 460 is slanted. Through this, a space occupied by the damper 460 in the fixed plate 420 or the rotary plate 410 may be minimized. Specifically, the free end 462 and the pressing member 464 that presses the free end 462 may be disposed near the hinge 430. The free end 462 and the pressing member 464 disposed near the hinge 430 may have a short stroke during a rotation. The short stroke may minimize an occupied space.

The damper 460 may be implemented in various ways. For example, the damper 460 may be provided in a hydraulic type. The hydraulic damper 460 may have a relatively high durability and reliability. The hydraulic damper 460 may include a fixed end 461 case for mounting oil, a spring provided in the fixed end 461 case, and a piston included in the free end 462 to press the spring and the oil in the fixed end 461.

The damper 460 may have a small thickness to minimize the increase in the thickness of the hinge assembly 400. Desirably, a diameter of the damper 460 may be about 2.9 millimeters (mm).

Figure 9A:
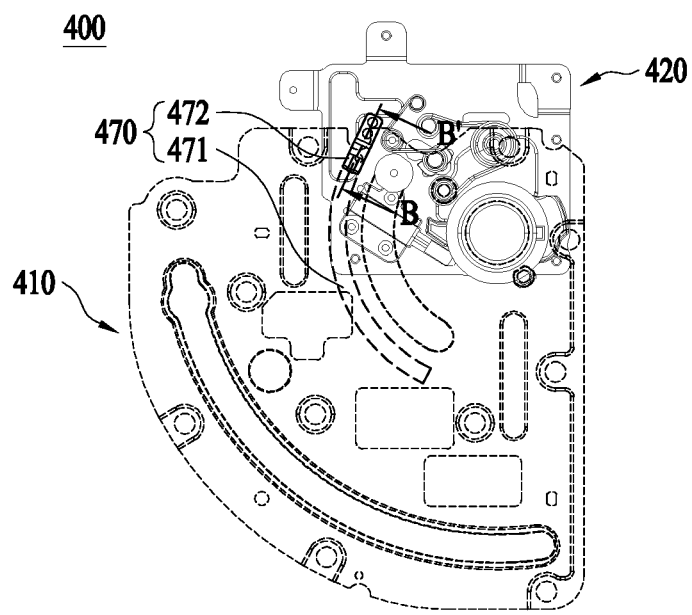
FIGS. 9A through 9C are a front view of the hinge assembly, a cross-sectional view of the hinge assembly taken in a direction B-B', and a partial perspective view of the hinge assembly.
Figure 9B:
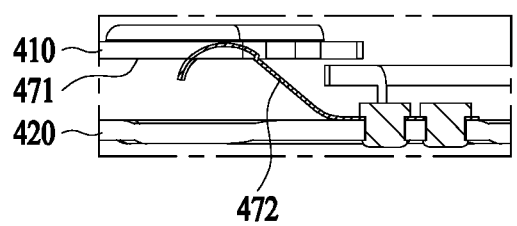
Figure 9C:
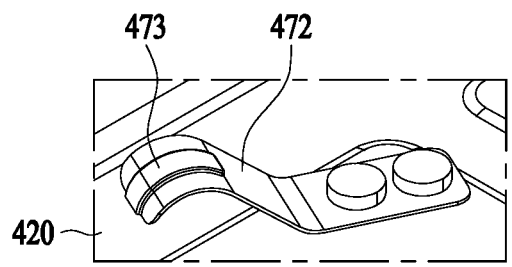

FIGS. 9A through 9C are a front view of the hinge assembly 400, a cross-sectional view of the hinge assembly 400 taken in a direction B-B', and a partial perspective view of the hinge assembly 400.

The mobile terminal 100 may have an antenna for performing wireless communication. The antenna may include a radiation pattern, and it is desirable that the antenna including the radiation pattern is mounted on the main body 300. In some cases, the antenna may not exhibit a predetermined performance due to the rotation of the rotary plate 410. This is because the rotation of the rotary plate 410 or the swivel body 200 may unintentionally interfere with a radiation of the antenna.

To prevent such instability, the conductive area of the rotary plate 410 may be continuously electrically connected to be placed within a range controllable in association with the antenna radiation. That is, the rotary plate 410 and the fixed plate 420 may be electrically connected, and the electrical connection may be continuously maintained irrespective of an angle that the rotary plate 410 rotates to be positioned at.

To exhibit such effect, at least an area of each of the rotary plate 410 and the fixed plate 420 may include a conductive material. As an example, the rotary plate 410 and the fixed plate 420 may be entirely formed of a conductive material, for example, metal.

A connector 470 may electrically connect a conductive area (or the at least the area) of the rotary plate 410 and a conductive area (or the at least the area) of the fixed plate 420. The connection may be maintained while the swivel body 200 rotates from the closed state to reach the open state.

To maintain the electrical connection, the connector 470 may include a connection rail 471 and a connection protrusion 472. The connection rail 471 may form a conductive arc area provided on a side of one of the rotary plate 410 or the fixed plate 420. The connection protrusion 472 may be provided on a side of a remaining one to contact the connection rail 471 while moving along the arc during the rotation.

In the present embodiment, it is assumed that the connection rail 471 is provided on the rotary plate 410 and the connection protrusion 472 is provided on a side of the fixed plate 420.

The connection protrusion 472 may include an elastic area elastically pressed in the front and rear direction. The connection protrusion 472 may be provided in a form of a metal plate. Also, the connection protrusion 472 may be fixed to the fixed plate 420 at one side and have a free end at the other side, thereby obtaining an elasticity itself.

The connection protrusion 472 may be connected to the fixed plate 420 at one side and contact the rotary plate 410 at the other side. The other side of the connection protrusion 472 may have an embossing 473 having a protruding shape. The embossing 473 may contact the rotary plate 410 to reduce a possibility of scratching the connection rail 471.

Referring back to FIG. 5, the first rotation rail 441 and the connection rail 471 may be provided simultaneously on a side of one of the rotary plate 410 or the fixed plate 420. This is because a member may have a relatively large size to implement at least one arc-shaped configuration, so that it is efficient, in terms of space utilization, to incorporate all arc-shaped configurations into the relatively large member. As an example, both the first rotation rail 441 and the connection rail 471 may be provided in the rotary plate 410.

Figure 10A:
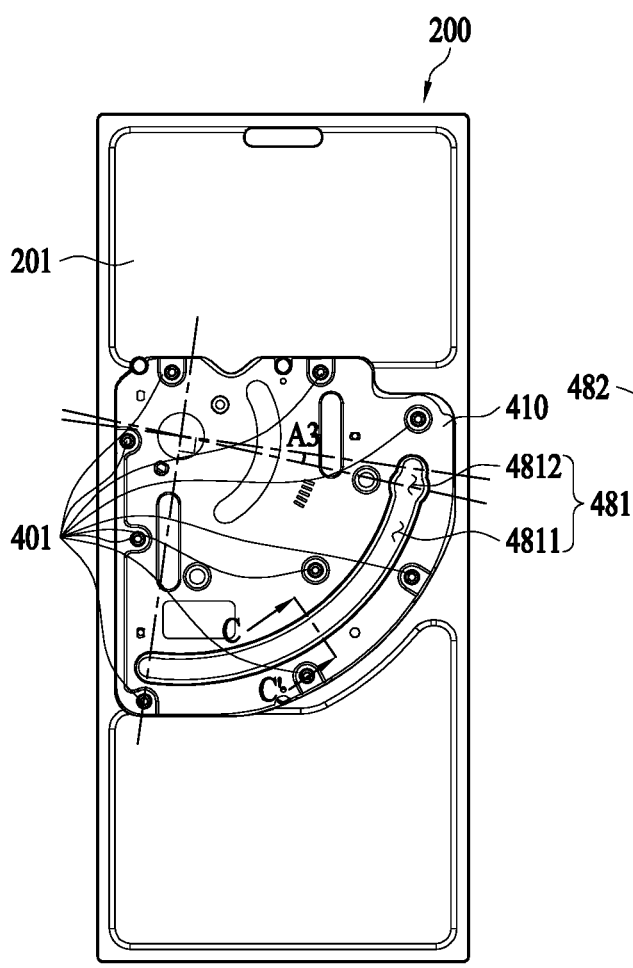
FIGS. 10A and 10B illustrate inner sides of the main body and the swivel body according to the present disclosure.
Figure 10B:
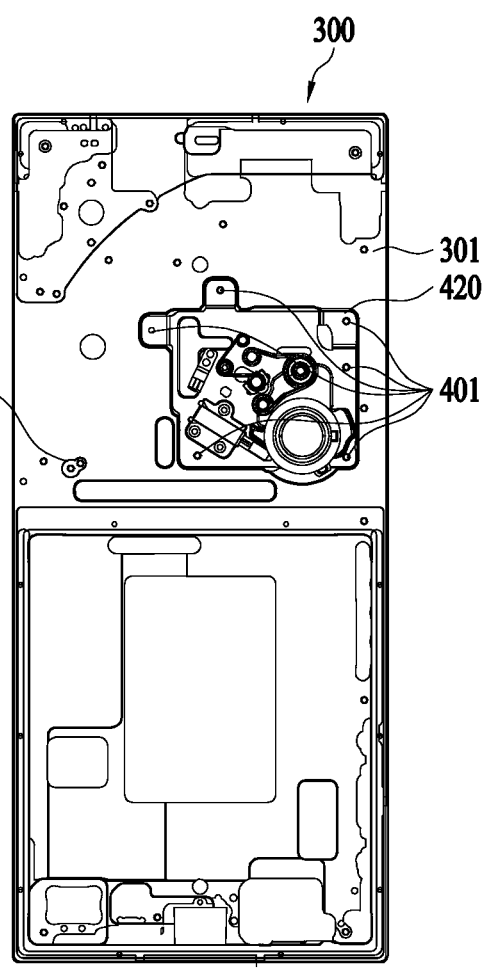
Figure 11:
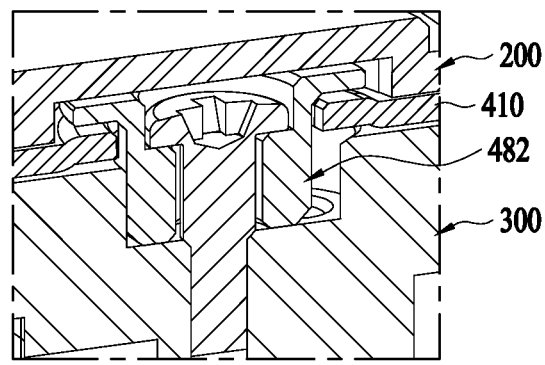
FIG. 11 is a cross-sectional view taken in a direction C-C' of FIG. 10A in a state in which the main body and the swivel body are coupled.

FIGS. 10A and 10B illustrate inner sides of the main body 300 and the swivel body 200 according to the present disclosure, and FIG. 11 is a cross-sectional view taken in a direction C-C' of FIG. 10A in a state in which the main body 300 and the swivel body 200 are coupled. FIG. 11 is based on a case in which a second slider 482 is rotated to be located at a cross-section position. FIG. 4 will be referenced together.

The rotary plate 410 may be coupled to the swivel body 200. The fixed plate 420 may be coupled to the main body 300. Specifically, the rotary plate 410 may be coupled to a rear case 201 of the swivel body 200 and the fixed plate 420 may be coupled to a front case 301 of the main body 300. Each coupling may be a screw 401 coupling. The screw 401 coupling may have a strong bonding force and may be easy to repair and replace.

The hinge 430 and the first rotation rail 441 may fasten the rotary plate 410 and the fixed plate 420 to guide a rotation and simultaneously prevent a farther separation in the front and rear direction. However, since the rotary plate 410 or the fixed plate 420 is smaller in size than the main body 300 or the swivel body 200, it is difficult to solve the farther separation between the swivel body 200 and the main body 300 using only a structure of the hinge 430 and the first rotation rail 441.

A second rotation rail 481 and the second slider 482 may solve such problem. The rotary plate 410 may include the second rotation rail 481. The second rotation rail 481 may be coupled with the second slider 482 of the main body 300. Like the first rotation rail 441, the second rotation rail 481 may have an arc-shaped opening area. The second rotation rail 481 may form the opening area over 90°. The second rotation rail 481 and the hinge 430 may be concentric.

To earnestly fulfill the above-described goal, the second rotation rail 481 may have a larger diameter than that of the first rotation rail 441.

The second slider 482 may be provided in a form of a screw connected to the main body 300. A screw head may be hooked on the second rotation rail 481, so that the separation in the front and rear direction may be prevented.

The second rotation rail 481 may have a constraining area 4811 that prevents the constrained second slider 482 from deviating in the front and rear direction. In addition, the second rotation rail 481 may also have a coupling hole 4812 such that the second slider 482 is inserted into the constraining area 4811 of the second rotation rail 481 when coupling the main body 300 and the swivel body 200 in a manufacturing stage of the mobile terminal 100. When the swivel body 200 is appropriately positioned so that the second slider 482 passes the coupling hole 4812 in the front and rear direction, and then the swivel body 200 is rotated, the second slider 482 may be seated and fastened in the constraining area 4811.

In this case, a position of the coupling hole 4812 on the second rotation rail 481 may become problematic. To prevent this, the coupling hole 4812 may be positioned such that the second slider 482 overlaps and passes the coupling hole 4812 in an intermediate state other than the open state or a state in which the swivel body 200 is completely closed with respect to the main body 300. In a certain rotating state of the swivel body 200, the second slider 482 may be unfastened due to the provision of the coupling hole 4812. This is because a probability of being separated again may increase if the position corresponds to the closed state or the open state. Thus, based on the closed state, the coupling hole 4812 may be provided to correspond to a position tilted at a predetermined angle A3 relative to one end of the constraining area 4811. For example, the coupling hole 4812 may be formed at a position tilted 7° relative to one end of the constraining area 4811 corresponding to the closed state. In this example, the swivel body 200 may be rotated 7° based on the closed state, coupled to the main body 300, and then positioned to be in the closed state again so as to complete the coupling.

Referring to FIG. 5, as described above, it is desirable that the rotary plate 410 and the fixed plate 420 have minimum sizes. In other words, the rotary plate 410 and the fixed plate 420 may be implemented in minimum sizes without having unnecessary areas while the aforementioned components are mounted therein. For example, a portion of an outer rim of the rotary plate 410 may be formed in an arc shape to occupy a minimum area, the portion corresponding to a second rotation rail 481 side.

For a similar purpose, the first rotation rail 441 may be located out of an area of the fixed plate 420 based on the closed state. That is, since the fixed plate 420 does not need to include an area of the first rotation rail 441, the area including the fixed plate 420 may be formed to be smaller than that. For example, based on the closed state, the first rotation rail 441 may have an area that does not overlap the fixed plate 420 in the front and rear direction.

Figure 12A:
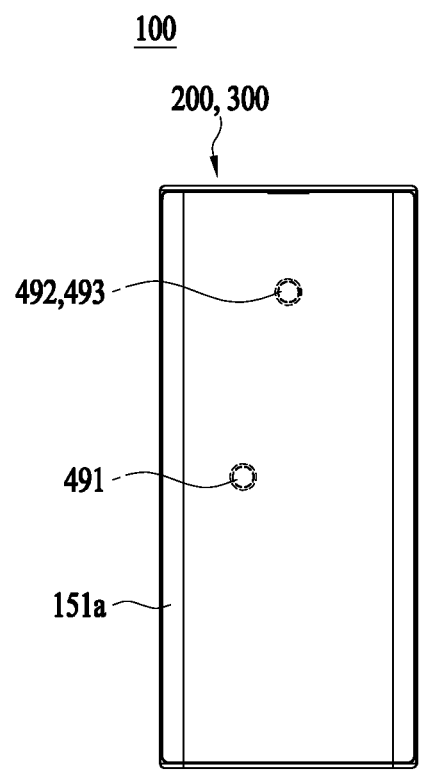
FIGS. 12A and 12B illustrate the mobile terminal before and after opening and closing.
Figure 12B:
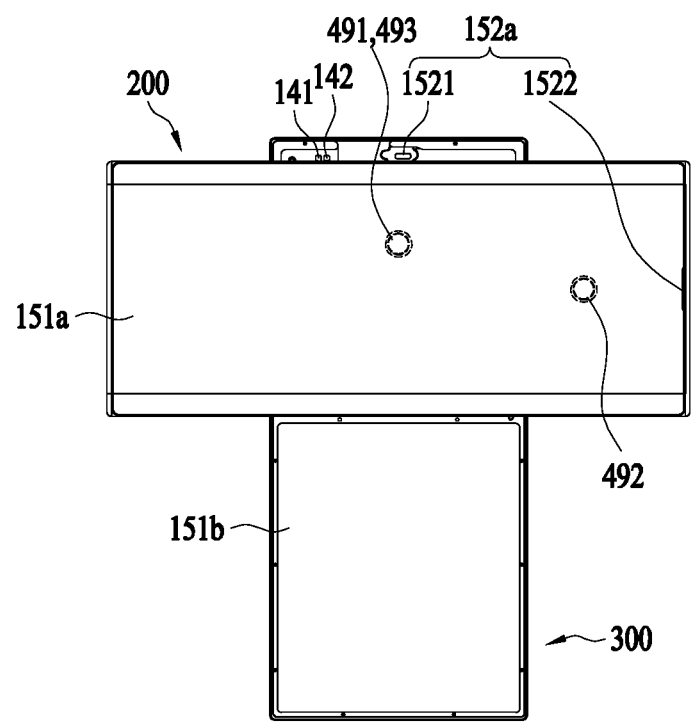

FIGS. 12A and 12B illustrate the mobile terminal 100 before and after opening and closing.

A magnetic coupling of the main body 300 and the swivel body 200 may be implemented to assist fixation in a closed state and an open state and provide a sense of distinction between the closed state and the open state to a user.

The magnetic coupling may be implemented using three members. When the main body 300 and the fixed plate 420 are defined as a fixed part and the swivel body 200 and the rotary plate 410 are defined as a rotating part, a first magnet 491 and a second magnet 492 may be provided on one of the fixed part or the rotating part and a third magnet 493 may be provided on a remaining one. In the closed state, the second magnet 492 and the third magnet 493 may face each other to mutually generate an attractive force. In the open state, the first magnet 491 and the third magnet 493 may overlap in the front and rear direction to mutually generate an attractive force.

In the cases of FIGS. 4 and 12, the rotating part may include the first magnet 491 and the second magnet 492 and the fixed part may include the third magnet 493. Specifically, the first magnet 491 may be disposed at one position on the rotary plate 410 and the second magnet 492 may be provided in the rear case 201 of the swivel body 200. The third magnet 493 may be provided in the main body 300, specifically, the front case 301. In this case, distances between the magnets 491, 492, and 493 may be minimized, which may increase an effectiveness.

FIGS. 13A and 13B are a side view illustrating the hinge assembly 400 and an enlarged view illustrating an area around the hinge 430.

A polyoxymethylene (POM) member may be disposed between the rotary plate 410 and the fixed plate 420 to keep a distance between the rotary plate 410 and the fixed plate 420. A POM member 510 may be provided along a circumference of the hinge 430 located between both plates to maximize a space utilization. A POM material may have a relatively high durability and not generate little noise even in friction with a counterpart. Thus, the POM material may be suitable for supporting repetitive opening and closing of the swivel body 200.

The POM member 510 may have a shape that avoids interferences with components around the fixed plate 420 or the rotary plate 410. The POM member 510 may be fixed to one of facing sides of the rotary plate 410 or the fixed plate 420. A face opposite to an attachment face 511 of the POM member 510 may include a support face 512 facing the other side, that is, a remaining one of the rotary plate 410 or the fixed plate 420.

In this instance, the support face 512 may be directly supported by the plate of the other side and may also include a separate protrusion to minimize an occurrence of friction. That is, a friction reducing portion 513 may form a protruding line in one area of the support face 512 to support the plate of the other side.

Meanwhile, due to a manufacturing tolerance of the POM member 510, a coupling tolerance of the rotary plate 410 and the fixed plate 420, and the like, a frictional force between both plates provided by the POM member 510 may not be constant. At least one pressing elastic member 514 may be provided on one side surface of the POM member 510 to press the POM member 510 to the rotary plate 410 or the fixed plate 420 in the front and rear direction, thereby achieving an appropriate supporting force and frictional force.

The pressing elastic member 514 may be provided in a form of a coil spring disposed in the front and rear direction. The coil spring may be provided in plural. The fixed plate 420 may include a seating protrusion corresponding to an inner circumferential face of the coil spring to prevent lateral separation of the coil spring. Also, the POM member 510 may have an accommodating space 515 in which the pressing elastic member 514 is to be located.

Effects of a mobile terminal of the present disclosure are described as follows.

According to at least one example embodiment of the present disclosure, it is possible to select a highly versatile use or compact use by expanding and reducing a display area.

Further, according to at least one example embodiment of the present disclosure, it is possible to implement a structure in which a display area is changeable without using a flexible display.

Further, according to at least one example embodiment of the present disclosure, it is possible to selectively use a horizontal mode or a vertical mode while maintaining a same gripping state.

Further, according to at least one example embodiment of the present disclosure, it is possible to implement a stable body rotating structure.

Further, according to at least one example embodiment of the present disclosure, it is possible to implement a body rotating structure while minimizing an increase in volume or weight.

Further, according to at least one example embodiment of the present disclosure, a user may easily rotate a body of a mobile terminal.

Further, according to at least one example embodiment of the present disclosure, it is possible to minimize a shock applied to a mobile terminal by smoothly opening and closing a body, which may improve a user's convenience of use.

Further, according to at least one example embodiment of the present disclosure, it is possible to prevent both bodies rotating relative to each other from being decoupled or separated farther.

Additional ranges of possibilities will become apparent from the following detailed description. It should be understood, however, that the detailed description and specific examples, such as the preferred embodiments of the invention, are given by way of illustration only, since various changes and modifications within the spirit and scope of the disclosure will be apparent to those skilled in the art.

It is apparent to those skilled in the art that the present disclosure may be materialized in other specific forms without departing from the essential characteristics of the present disclosure.

The above detailed description should not be construed as limiting in all aspects and should be considered as illustrative. The scope of the invention should be determined by reasonable interpretation of the appended claims, and all changes within the equivalent scope of the disclosure are included in the scope of the disclosure.

What is claimed is:

1. A mobile terminal comprising:
   a swivel body configured to provide a first screen on a front side of the swivel body;
   a main body located behind the swivel body to overlap with the main body and configured to provide a second screen on a front side of the main body; and
   a hinge assembly coupling the swivel body and the main body such that the swivel body is rotatable based on a rotation axis in a front and rear direction with respect to the main body to allow the swivel body to cover or uncover the second screen,
   wherein the hinge assembly comprises:
   a rotary plate coupled to the swivel body;
   a fixed plate coupled to the main body;
   a hinge configured to provide a rotation axis for a rotation of the rotary plate with respect to the fixed plate;
   a first rotation rail provided at one of the rotary plate or the fixed plate and a first slider provided at a remaining one of the rotary plate or the fixed plate to move along the first rotation rail, wherein the first rotation rail comprises an arc shape;
   an elastic part coupled to the rotary plate at a first side of the elastic part and coupled to the fixed plate at a second side of the elastic part and configured to provide a restoring force that causes the swivel body to be biased toward a closed or open state based on a first threshold rotation angle, wherein the closed state corresponds to the swivel body covering the second screen on the main body and the open state corresponds to the swivel body rotating with respect to the main body to uncover the second screen, wherein the first threshold rotation angle corresponds to a case in which the swivel body is in the closed state; and
   an auxiliary elastic part configured to provide a force to the elastic part for assisting a motion of the elastic part.

2. The mobile terminal of claim 1, wherein the elastic part comprises:
   a first open-and-close rivet provided in the rotary plate;
   a second open-and-close rivet provided in the fixed plate; and
   an open-and-close spring rotatably coupled to the first open-and-close rivet and the second open-and-close rivet,
   wherein the auxiliary elastic part comprises:
   a first auxiliary rivet configured to move along a rivet rail provided on the fixed plate;
   a second auxiliary rivet provided at the fixed plate; and
   an auxiliary spring rotatably coupled to the first auxiliary rivet at a first end of the auxiliary spring and coupled to the second auxiliary rivet at a second end of the auxiliary spring, wherein the first auxiliary rivet is further configured to provide a force to the first open-and-close rivet at the first threshold rotation angle.

3. The mobile terminal of claim 2, wherein the first auxiliary rivet and the first open-and-close rivet comprise circular shapes and the first open-and-close rivet and the first auxiliary rivet are in contact with each other when viewed from a front of the mobile terminal, and the first open-and-close rivet is further configured to provide a force to the first auxiliary rivet such that the auxiliary spring is maximally compressed at a second threshold rotation angle.

4. The mobile terminal of claim 3, wherein the first threshold rotation angle is greater than the second threshold rotation angle in the closed state.

5. The mobile terminal of claim 4, wherein the first threshold rotation angle is 19 degrees and the second threshold rotation angle is 17 degrees in the closed state.

6. The mobile terminal of claim 3, wherein the fixed plate comprises a support such that the first auxiliary rivet is seated in a position to be provided a force by the first open-and-close rivet.

7. The mobile terminal of claim 1, wherein the hinge assembly further comprises a damper disposed between the rotary plate and the fixed plate to retract or expand in accordance with the rotation of the swivel body.

8. The mobile terminal of claim 7, wherein the fixed plate comprises a receiving groove formed in the fixed plate to receive the damper.

9. The mobile terminal of claim 8, wherein the hinge assembly further comprises a pressing member provided at the rotary plate and configured to move a free end of the damper in accordance with the rotation of the rotary plate to vary a stroke of the damper.

10. The mobile terminal of claim 7, wherein the damper is disposed in a slanted manner such that the damper retracts or expands in an oblique direction with respect to a front of the mobile terminal.

11. The mobile terminal of claim 1, wherein at least one area of the rotary plate or the fixed plate comprises a conductive material, and wherein the mobile terminal further comprises a connector configured to electrically couple the at least one area of the rotary plate or the at least one area of the fixed plate when the swivel body is changed from the closed state to the open state.

12. The mobile terminal of claim 11, wherein the connector comprises:
    a connecting rail provided at one of the rotary plate or the fixed plate and comprising a conductive rail of an arc area; and
    a connecting protrusion provided in a remaining one of the rotary plate or the fixed plate and configured to contact the connecting rail while moving along the arc area during a rotation of the swivel body.

13. The mobile terminal of claim 12, wherein the connecting protrusion further comprises an elastic area configured to be elastically pressed with respect to the front and rear direction.

14. The mobile terminal of claim 1, further comprising:
    a second rotation rail comprising an arc shape; and
    a second slider provided at the main body to move along the second rotation rail.

15. The mobile terminal of claim 14, wherein the second rotation rail comprises a constraint area that prevents the second slider from deviating in a front and rear direction, wherein the second rotation rail comprises a coupling hole that allows the second slider to deviate in the front and rear direction, wherein the coupling hole and the second slider overlap in the front and rear direction in a state in which the swivel body is rotated at a predetermined angle in the closed state.

16. The mobile terminal of claim 14, wherein an outer rim of the rotary plate comprises an arc shape corresponding to the second rotation rail.

17. The mobile terminal of claim 1, wherein the first rotation rail is provided at the rotary plate, and the first rotation rail comprises an area that does not overlap the fixed plate in a front and rear direction in a closed state.

18. The mobile terminal of claim 1, further comprising:
a first magnet and a second magnet disposed at the swivel body or the rotary plate; and
a third magnet provided at the main body and configured to provide an attractive force with respect to the first magnet or the second magnet to correspond to a closed state or an open state, respectively.

19. The mobile terminal of claim 1, further comprising:
a polyoxymethylene (POM) member provided along a circumference of the hinge to support the rotary plate and the fixed plate in a front and rear direction; and
at least one pressing elastic member provided on a side of the POM member to provide a force to the POM member to the rotary plate or the fixed plate in the front and rear direction.

20. The mobile terminal of claim 19, wherein the POM member comprises:
a face coupled to one of the rotary plate or the fixed plate;
a support face facing a remaining one of the rotary plate or the fixed plate; and
a friction reducing portion that forms a protruding line in one area of the support face to support the remaining one of the rotary plate or the fixed plate.

\* \* \* \* \*